US012105293B2

(12) United States Patent
Takahata et al.

(10) Patent No.: US 12,105,293 B2
(45) Date of Patent: Oct. 1, 2024

(54) HEAD-UP DISPLAY

(71) Applicant: Japan Display Inc., Tokyo (JP)

(72) Inventors: Masashi Takahata, Tokyo (JP); Hitoshi Saito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/233,626

(22) Filed: Aug. 14, 2023

(65) Prior Publication Data

US 2023/0384597 A1    Nov. 30, 2023

Related U.S. Application Data

(63) Continuation of application No. PCT/JP2022/003890, filed on Feb. 1, 2022.

(30) Foreign Application Priority Data

Feb. 19, 2021  (JP) ................. 2021-025538

(51) Int. Cl.
*G02B 27/01* (2006.01)
*G06F 3/14* (2006.01)
(Continued)

(52) U.S. Cl.
CPC ........... *G02B 27/0172* (2013.01); *G06F 3/14* (2013.01); *G09G 3/18* (2013.01); *G09G 3/36* (2013.01); *G09G 2320/041* (2013.01)

(58) Field of Classification Search
CPC .... B60K 35/00; G02B 27/01; G02B 27/0101; G02B 27/0172; G02F 1/133;
(Continued)

(56) References Cited

U.S. PATENT DOCUMENTS

2013/0188259 A1* 7/2013 Nakamura ......... G02B 27/0101
                                                        359/630
2014/0177040 A1   6/2014 Uehara
(Continued)

FOREIGN PATENT DOCUMENTS

JP     2012-058689 A    3/2012
JP     2014-123076 A    7/2014
(Continued)

OTHER PUBLICATIONS

International Search Report issued in International Patent Application No. PCT/JP2022/003890 on Apr. 5, 2022 and English translation of same. 5 pages.
(Continued)

*Primary Examiner* — Dmitriy Bolotin
(74) *Attorney, Agent, or Firm* — K&L Gates LLP

(57) ABSTRACT

A head-up display includes: display panels, and a light guide configured to direct light from the display panels such that projection positions of images from display regions of the display panels join on the projection target. At least one of time division control and multiple display control is applied to the display panels. The time division control is operation control of the display panels such that the display panels project images at different timings. The multiple display control is operation control of the display panels in which partial regions are set in each display region such that the number of the partial regions corresponds to the number of the display panels, an image is output in one of the partial regions in the display region of each display panel such that the positions of the images projected by the display panels on the projection target differ from one another.

9 Claims, 13 Drawing Sheets

(51) Int. Cl.
*G09G 3/18* (2006.01)
*G09G 3/36* (2006.01)

(58) Field of Classification Search
CPC ....... G02F 1/1347; G03B 21/00; G03B 21/14; G03B 21/16; G06F 3/14; G09G 2310/0221; G09G 2320/0233; G09G 2320/041; G09G 3/002; G09G 3/18; G09G 3/36
See application file for complete search history.

(56) References Cited

U.S. PATENT DOCUMENTS

| | | | |
|---|---|---|---|
| 2015/0015962 A1* | 1/2015 | Takasu | G02B 27/01 359/630 |
| 2015/0294644 A1* | 10/2015 | Matsushima | G09G 3/3648 345/589 |
| 2017/0031162 A1 | 2/2017 | Konishi et al. | |
| 2019/0346713 A1* | 11/2019 | Miyake | B60K 35/23 |
| 2021/0243419 A1* | 8/2021 | Kusafuka | H04N 13/122 |
| 2021/0364861 A1* | 11/2021 | Lum | H05B 47/105 |
| 2022/0128859 A1* | 4/2022 | Takahata | G02B 27/0101 |

FOREIGN PATENT DOCUMENTS

| | | |
|---|---|---|
| JP | 2016-045244 A | 4/2016 |
| JP | UP2017-030737 A | 2/2017 |
| JP | 2019-113595 A | 7/2019 |
| JP | 2020-017935 A | 1/2020 |

OTHER PUBLICATIONS

Written Opinion issued in International Patent Application No. PCT/JP2022/003890 on Apr. 5, 2022. 4 pages.

* cited by examiner

FIG.16

| TEMPERATURE | DETERMINATION | LIGHT SOURCE LUMINANCE |
|---|---|---|
| LOWER THAN 50°C | N | 100% |
| EQUAL TO OR HIGHER THAN 50°C AND LOWER THAN 60°C | H | 50% |
| EQUAL TO OR HIGHER THAN 60°C AND LOWER THAN 70°C | H | 40% |
| EQUAL TO OR HIGHER THAN 70°C AND LOWER THAN 80°C | H | 30% |
| EQUAL TO OR HIGHER THAN 80°C AND LOWER THAN 90°C | H | 20% |
| EQUAL TO OR HIGHER THAN 90°C AND LOWER THAN 100°C | H | 10% |
| EQUAL TO OR HIGHER THAN 100°C | H | 0% |

HEAD-UP DISPLAY

CROSS-REFERENCE TO RELATED APPLICATION

This application is a continuation of International Patent Application No. PCT/JP2022/003890 filed on Feb. 1, 2022, which application claims the benefit of priority from Japanese Patent Application No. 2021-025538 filed on Feb. 19, 2021, the entire contents of which are incorporated herein by reference.

BACKGROUND

1. Technical Field

What is disclosed herein relates to a head-up display.

2. Description of the Related Art

What is called head-up displays (HUDs) that project an image onto a member having a light-transmitting property, such as glass, to cause a person who directs the line of sight to the member to recognize as if the image is on the line of sight have been known (for example, Japanese Patent Application Laid-open Publication No. 2014-123076).

Sunlight may enter an image projection unit of such an HUD. As a specific example, in the HUD that is provided to an automobile such as a four-wheeled vehicle and projects images on a windshield of the automobile, sunlight passing through the windshield and entering the inside of the vehicle may reach a liquid crystal display panel of the image projection unit. This can cause the liquid crystal display panel to be heated by sunlight to a temperature significantly higher than a temperature at which the liquid crystal display panel normally operates. In this case, the liquid crystal display panel of a conventional HUD may not be able to properly output an image corresponding to input. Even in such cases, an HUD has been required that can continue projecting images for a longer period of time.

For the foregoing reasons, there is a need for an HUD that can continue projecting images for a longer period of time.

SUMMARY

According to an aspect, a head-up display that is configured to project an image onto a projection target having a light-transmitting property to make a virtual image visible to a user, includes: a plurality of display panels, and a light guide that is configured to direct light from the display panels such that projection positions of images from display regions of the display panels join on the projection target. At least one of time division control and multiple display control is applied to the display panels. The time division control is operation control of the display panels such that the display panels project images at different timings. The multiple display control is operation control of the display panels in which partial regions are set in each of the display regions such that the number of the partial regions corresponds to the number of the display panels, an image is output in one of the partial regions in the display region of each display panel such that the positions of the images projected by the display panels on the projection target differ from one another.

BRIEF DESCRIPTION OF THE DRAWINGS

FIG. 16 is a diagram illustrating an example of the outputs of the display panels and lighting control of the backlights when output control in consideration of temperature is not required;

DETAILED DESCRIPTION

Figure 1:
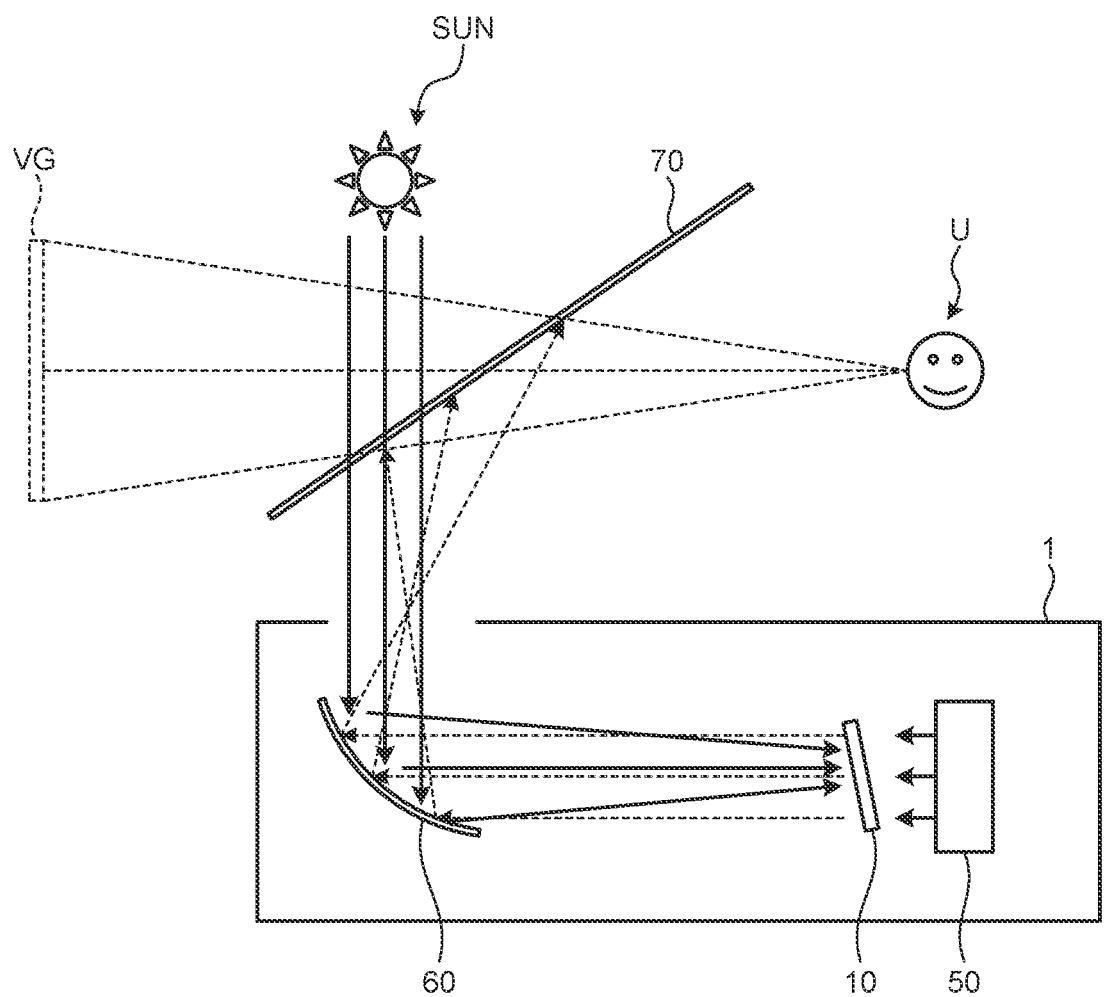
FIG. 1 is a schematic diagram illustrating an exemplary structure of an HUD in an embodiment.

Hereinafter, an embodiment of the present disclosure will be described with reference to the drawings. What is disclosed herein is merely an example, and it is needless to say that appropriate modifications within the gist of the invention at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

FIG. 1 is a schematic diagram illustrating an exemplary structure of an HUD 1 in the embodiment. The HUD 1 includes a display panel 10, a backlight 50, a concave mirror 60, and an image processing circuit 100 (refer to FIGS. 2 and 14), which is described later.

The display panel 10 is what is called a liquid crystal display panel. The backlight 50 has a light emitting element, such as a light emitting diode (LED), for example, and emits light from a rear side of the display panel 10.

The concave mirror 60 reflects light that is emitted by the backlight 50 and transmitted through the display panel 10, and directs the light to a projection target onto which an image output by the HUD 1 is projected.

Hereinafter, when referring to light output from the HUD 1, it refers to the light. In FIG. 1, a windshield 70 is exemplified as the projection target. The windshield 70 is the windshield of a four-wheeled vehicle or an aircraft, for example, but is not limited to this example. The projection target can be modified as appropriate as long as the HUD can project images onto the projection target.

Light output from the HUD 1 is projected onto the windshield 70. In FIG. 1, the light beams that are output from the HUD 1 and projected onto the windshield 70 are schematically illustrated with the dashed arrows. A user U, who directs the line of sight to light projected onto the windshield 70, visually recognizes a virtual image VG.

In the example illustrated in FIG. 1, the image output from the display panel 10 is projected onto the windshield 70 in a mirror-reversed state because there is an only single optical member, such as the concave mirror 60, that reflects the light on the light travel route between the display panel 10 and the windshield 70. When FIG. 1 employs a faithful representation, the output of the display panel 10 is controlled in consideration of such a mirror-reversed state. One method that does not cause the mirror-reversed state is to add one more optical member that reflects the light on the light travel route between the display panel 10 and the front glass 70. In the following explanation, for the sake of clarity, it is assumed that no such mirror-reversed state occurs.

Although the details are described later, the structure of the HUD 1 illustrated in FIG. 1 is only schematic to illustrate the basic mechanism, and does not specify the actual number of display panels 10 and the like. The HUD 1 includes at least a plurality of display panels 10. Prior to its detailed description, the display panel 10 is explained.

Figure 2:
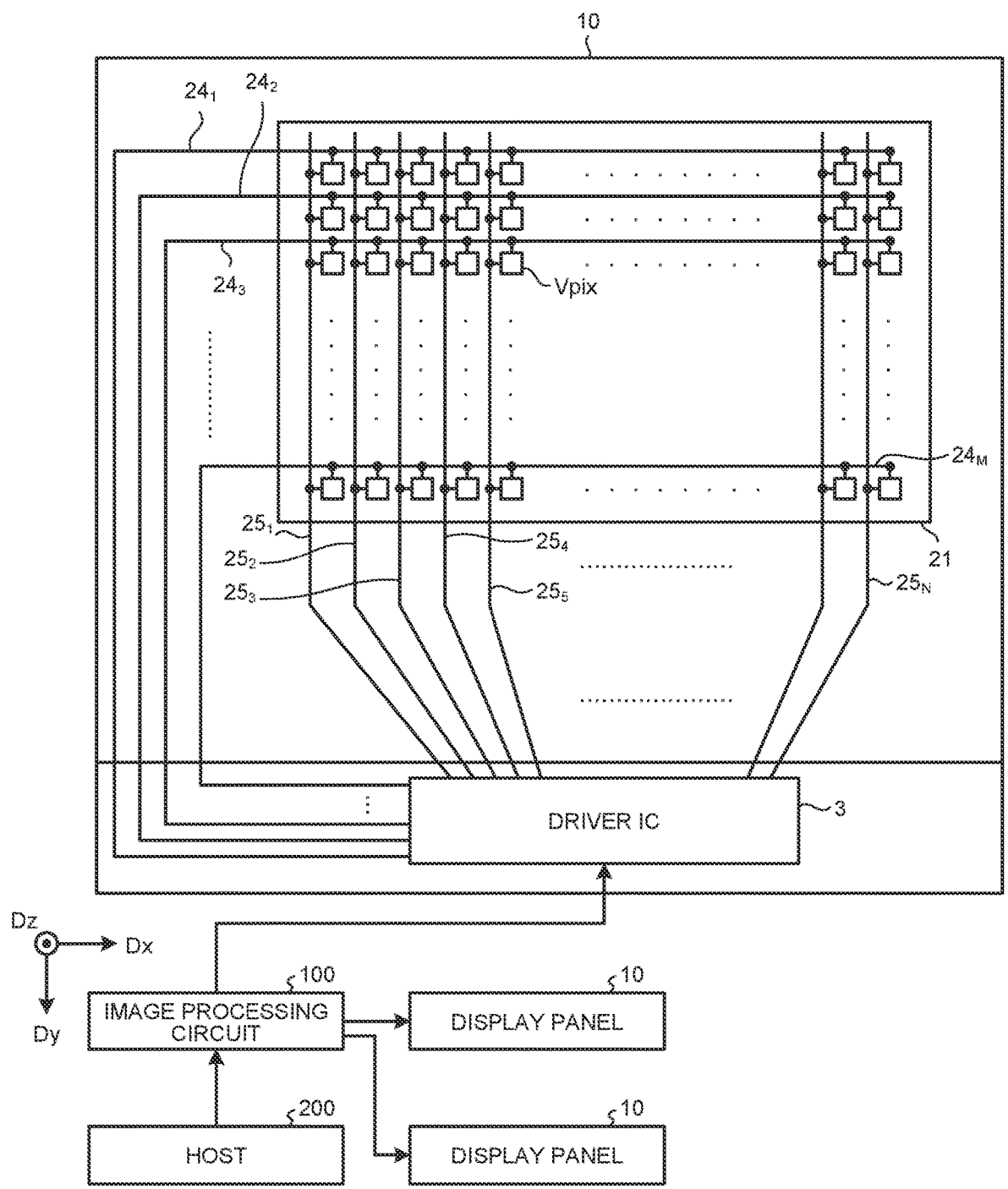
FIG. 2 is a block diagram illustrating an exemplary structure of a display panel.
Figure 3:
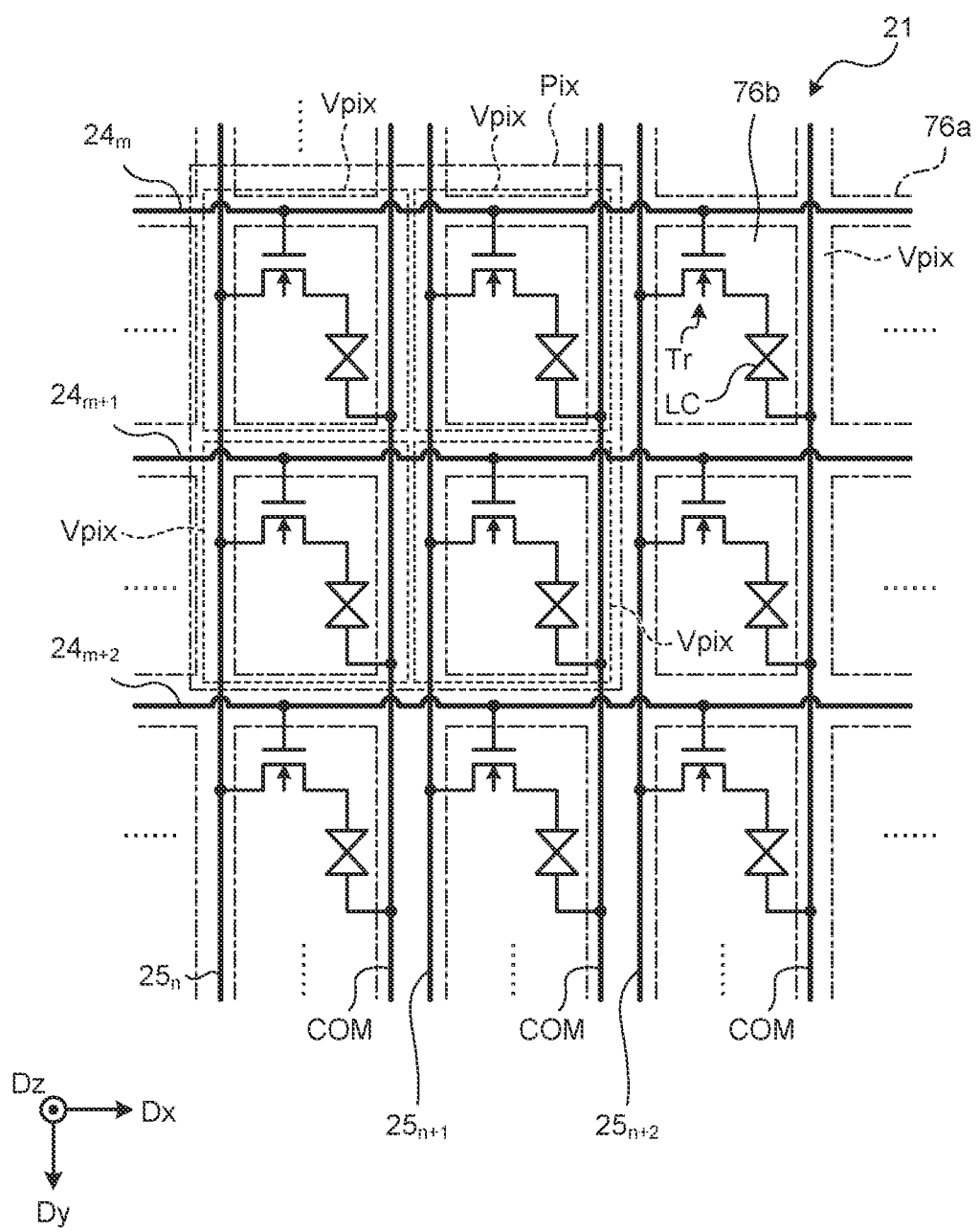
FIG. 3 is a circuit diagram illustrating an exemplary structure of a drive circuit that drives pixels of the display panel.

FIG. 2 is a block diagram illustrating an exemplary structure of the display panel 10. FIG. 3 is a circuit diagram illustrating an exemplary structure of a drive circuit that drives pixels Pix of the display panel 10. The display panel 10 is a display panel that includes a driver IC 3. The driver IC 3 is a display driver integrated circuit (DDIC), for example.

More specifically, the display panel 10 is a transmissive liquid crystal panel that performs output by projecting an image using light from the backlight 50 as a light source, for example. The liquid crystal panel is an insulating substrate having a light-transmitting property such as a glass substrate, for example. The liquid crystal panel has a display region 21, which is on the glass substrate. The display region 21 has a large number of pixels Pix including liquid crystal cells arranged in a matrix with a row-column configuration. The pixel Pix includes a plurality of sub-pixels Vpix (refer to FIG. 3). The liquid crystal panel is composed of a first substrate and a second substrate. A large number of pixel circuits including active elements (e.g., transistors) are formed on the first substrate in an arrangement of a matrix with a row-column configuration. The gap between the first substrate and the second substrate is maintained at a predetermined gap by photo spacers arranged and formed at various locations on the first substrate. A liquid crystal including crystal elements LC is encapsulated between the first and the second substrates to form a liquid crystal layer. The arrangement of the parts and the size of each part illustrated in FIG. 2 are schematic and do not reflect the actual arrangement and the like.

The display region 21 has a matrix structure with a row-column configuration in which the sub-pixels Vpix including the liquid crystal layers are arranged in M rows by N columns. In this specification, the row is referred to as a pixel row that has N sub-pixels Vpix aligned in one direction. The column is referred to as a pixel column that has M sub-pixels Vpix aligned in a direction perpendicular to the direction in which the rows extend. The values of M and N are determined according to the resolution in the direction Dy, which is a second direction, and the resolution in the direction Dx, which is a first direction. In the display region 21, scan lines $24_1$, $24_2$, $24_3$, . . . , and $24_M$ are wired row by row along the first direction Dx while signal lines $25_1$, $25_2$, $25_3$, . . . , and $25_N$ are wired column by column along the second direction Dy, for the M row-N column array of the sub-pixels Vpix. Hereinafter, in the present embodiment, the scan lines $24_1$, $24_2$, $24_3$, . . . , and $24_M$ may be collectively denoted as the scan lines 24, and the signal lines $25_1$, $25_2$, $25_3$, . . . , and $25_N$ may be collectively denoted as the signal lines 25. In the present embodiment, any three of the scan lines $24_1$, $24_2$, $24_3$, . . . , and $24_M$ are denoted as scan lines $24_m$, $24_{m+1}$, and $24_{m+2}$ (where m is a natural number satisfying m≤M−2), and any three of the signal lines $25_1$, $25_2$, $25_3$, . . . , and N are denoted as signal lines $25_n$, $25_{n+1}$, and $25_{n+2}$ (where n is a natural number satisfying n≤N−2).

The first direction Dx and the second direction Dy are directions along the plate surface of the display panel 10 and are perpendicular to each other. The third direction Dz is a direction perpendicular to the first direction Dx and the second direction Dy.

The driver IC 3 is a circuit mounted on the glass substrate of the liquid crystal panel by a chip on glass (COG) method, for example. The driver IC 3 is coupled to the image processing circuit 100 via a flexible printed circuit (FPC), which is not illustrated. The image processing circuit 100 is coupled to a host 200 via wiring, which is not illustrated. The host 200 is an external information processing device that outputs original image data to the image processing circuit 100. The image processing circuit 100 outputs pixel signals to individually drive the sub-pixels Vpix included in the pixel Pix, based on an input signal from the host 200. The pixel signal is a combination of gradation values of red (R), green (G), blue (B), and white (W), for example. The number and kinds of colors corresponding to the gradation values included in the pixel signal are arbitrary.

The driver IC 3 operates the display panel 10 in accordance with various signals applied from the image processing circuit 100. The image processing circuit 100 outputs various signals such as a master clock, a horizontal synchronization signal, a vertical synchronization signal, and pixel signals to the driver IC 3, for example. The driver IC 3 functions as a gate driver and a source driver based on those signals. One or both of the gate driver and the source driver may be formed on the glass substrate using thin film transistors (TFTs). In such a case, one or both of the gate driver and the source driver may be electrically coupled to the driver IC 3. The source driver and the gate driver may be electrically coupled to different driver ICs 3, or the same driver IC 3.

The gate driver latches digital data in units of a horizontal period corresponding to the horizontal synchronous signal in synchronization with the vertical and the horizontal synchronous signals. The gate driver outputs the latched digital data for one line sequentially as vertical scan pulses and applies the digital data to the scan lines 24 (the scan lines $24_1, 24_2, 24_3, \ldots,$ and $24_M$) in the display region 21 to select the sub-pixels Vpix sequentially row by row. The gate driver outputs the digital data sequentially to the scan lines $24_1$, $24_2, \ldots$ from one end side to the other end of the display region 21 in the row direction, for example. The gate driver can also output the digital data sequentially to the scan lines $24_M, \ldots$ from the other end side to the one end side of the display region 21 in the row direction.

The source driver receives pixel drive data generated based on the pixel signal, for example. The source driver writes the pixel drive data to the sub-pixels Vpix in the row selected by the vertical scan by the gate driver via the signal lines 25 (the signal lines $25_1, 25_2, 25_3, \ldots,$ and $25_N$), for each sub-pixel, for a plurality of sub-pixels, or for all sub-pixels simultaneously.

Examples of known drive methods for liquid crystal panels include line inversion, dot inversion, and frame inversion. The line inversion is a drive method that reverses the polarity of the video signal in a time period of 1H (H is a horizontal period), which corresponds to one line (one pixel line). The dot inversion is a drive method that alternately reverses the polarity of the video signal for each sub-pixel adjacent to each other for two intersecting directions (e.g., a matrix direction). The frame inversion is a drive method that reverses the video signals to be written to all sub-pixels Vpix at once with the same polarity for each frame corresponding to one screen. The display panel 10 can employ any of the above-described drive methods.

In the description of the present embodiment, each of the M scan lines, i.e., the scan lines $24_1, 24_2, 24_3, \ldots,$ and $24_M$ may be described as the scan line 24 when the M scan lines are collectively handled. The scan lines $24_m$, $24_{m+1}$, and $24_{m+2}$ in FIG. 3 are part of the M scan lines, i.e., the scan lines $24_1, 24_2, 24_3, \ldots,$ and $24_m$. Each of the N signal lines, i.e., the signal lines $25_1, 25_2, 25_3, \ldots,$ and $25_N$ may be described as the signal line 25 when the N signal lines are collectively handled. The signal lines $25_n$, $25_{n+1}$, and $25_{n+2}$ in FIG. 3 are part of the N signal lines, i.e., the signal lines $25_1, 25_2, 25_3, \ldots,$ and $25_N$.

The wiring lines are formed in the display region 21. Examples of the wiring lines include the signal lines 25 that supply the pixel signals to TFT elements Tr in the sub-pixels Vpix and the scan lines 24 that drive each TFT element Tr. The signal lines 25 extend in a plane parallel to the surface of the glass substrate described above and supply the pixel drive data generated based on the pixel signals for outputting images to the sub-pixels Vpix. The sub-pixels Vpix each include the TFT element Tr and the liquid crystal element LC. The TFT element Tr is formed with a thin-film transistor and is formed with an n-channel metal oxide semiconductor (MOS)-type TFT in this example. One of a source and a drain of the TFT element Tr is coupled to the signal lines 25, a gate of the TFT element Tr is coupled to the scan lines 24, and the other of the source and the drain is coupled to one end of the liquid crystal element LC. The one end of the liquid crystal element LC is coupled to the other of the source and the drain of the TFT element Tr while the other end of the liquid crystal element LC is coupled to a common electrode COM. A drive signal is applied to the common electrode COM by a drive electrode driver, which is not illustrated. The drive electrode driver may be included in the driver IC 3 or an independent circuit.

The sub-pixels Vpix belonging to the same row in the display region 21 are coupled one another by the scan lines 24. The scan lines 24 are coupled to the gate driver, and receive the vertical scan pulses of scan signals supplied from the gate driver. The sub-pixels Vpix belonging to the same column in the display region 21 are coupled one another by the signal lines 25. The signal lines 25 are coupled to the source driver, and receive the pixel signals supplied from the source driver. Furthermore, the sub-pixels Vpix belonging to the same column in the display region 21 are coupled one another by the common electrode COM. The common potential electrodes COM are coupled to the drive electrode driver, which is not illustrated, and receive the drive signals supplied from the drive electrode driver.

The gate driver applies the vertical scan pulses to the gates of the TFT elements Tr of the sub-pixels Vpix via the scan lines 24 to sequentially select one row (one horizontal line) of the sub-pixels Vpix formed in a matrix with a row-column configuration in the display region 21 as an image output target. The source driver supplies, via the signal lines 25, the pixel signal to each of the sub-pixels Vpix in one horizontal line of the lines that are selected sequentially by the gate driver. As a result, image output for one horizontal line is performed by the sub pixels Vpix in accordance with the supplied pixel signals.

As described above, the horizontal lines of the display panel 10 are sequentially selected one by one by the gate driver sequentially scanning the scan lines 24. In the display panel 10, the source driver supplies the pixel signals to the sub-pixels Vpix belonging to one horizontal line via the signal lines 25, and the image output is performed for each horizontal line. When this image output operation is performed, the drive electrode driver applies the drive signals to the common electrode COM corresponding to the horizontal line under the image output operation.

The display region 21 has a color filter. The color filter has a lattice-shaped black matrix 76a and apertures 76b. The black matrix 76a is formed to cover the peripheries of the sub-pixels Vpix as illustrated in FIG. 3. In other words, the black matrix 76a placed at the boundaries of the two-dimensionally arranged sub-pixels Vpix has a lattice shape. The black matrix 76a is formed of a material having a high light absorption rate. The apertures 76b are openings formed in the lattice shape according to the shape of the black matrix 76a and are arranged corresponding to sub-pixels Vpix.

The aperture 76b includes color regions corresponding to three-color (e.g., R (red), G (green), B (blue)) or four-color sub-pixels Vpix. Specifically, the aperture 76b includes color regions colored red (R), green (G), and blue (B), which are a form of first, second, and third colors, and the color region of a fourth color (e.g., white (W)), for example. In the color filter, color regions colored red (R), green (G), and blue (B) are periodically arranged in the apertures 76b, for example. When the fourth color is white (W), no coloring by the color filter is applied to the white (W) color region in the aperture 76b. If the fourth color is another color, the color employed as the fourth color is colored by the color filter. In the present embodiment, three color (R, G, and B) regions and a fourth color (e.g., W) is associated with each of the sub-pixels Vpix illustrated in FIG. 3. The set of four-color sub-pixels Vpix is associated with the pixel Pix. The pixel signal for one pixel Pix in the present embodiment corresponds to the output of one pixel Pix having red (R), green (G), blue (B), and the fourth color (white (W)) sub-pixels Vpix. In the explanation of the present embodiment, red (R), green (G), blue (B), and white (W) are sometimes simply described as R, G, B, and W. When the number of colors of the sub-pixels Vpix included in the pixel Pix is equal to or smaller than two, or equal to or larger than five, the digital data corresponding to the number of colors may be supplied based on the original image data.

The color filter may be a combination of other colors as long as they are colored differently. In general, in the color filter, the luminance of the green (G) color region is higher than that of the red (R) and blue (B) color regions. When the fourth color is white (W), the color filter may be colored white using a resin having a light-transmitting property.

The display region 21 is disposed in the region where the scan lines 24 and the signal lines 25 overlap with the black matrix 76a of the color filter when viewed from a direction perpendicular to the front surface of the display region 21. In other words, the scan lines 24 and the signal lines 25 are hidden behind the black matrix 76a when viewed from the direction perpendicular to the front surface. In the display region 21, the region where the black matrix 76a is not disposed is occupied with the apertures 76b.

As illustrated in FIG. 2, the image processing circuit 100 is coupled to a plurality of display panels 10. FIG. 2 illustrates a main structure (pixel Pix or the like) of one of the multiple display panels 10 as a representative, and the other display panels 10 are each illustrated as a single block in a simplified manner. The other display panels 10 each have the same structure as the representative one.

The HUD 1 projects an image corresponding to the virtual image VG using the display panels 10 operating together. The following describes a mechanism of image projection by the display panels 10 with reference to FIGS. 4 to 11. In the explanation with reference to FIGS. 4 to 11, a case is exemplified in which the number of display panels 10 is three.

Figure 4:
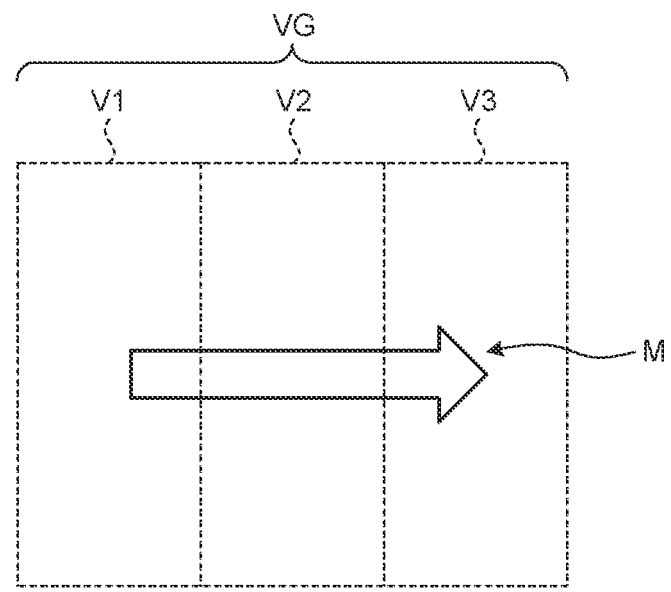
FIG. 4 is a schematic diagram illustrating an exemplary structure of a virtual image.

FIG. 4 is a schematic view illustrating an exemplary structure of the virtual image VG. The virtual image VG illustrated in FIG. 4 is a virtual image that makes an object M visible to the user U. As illustrated in FIG. 4, the virtual image VG is formed by the combination of partial projection images V1, V2, and V3.

Figure 5:
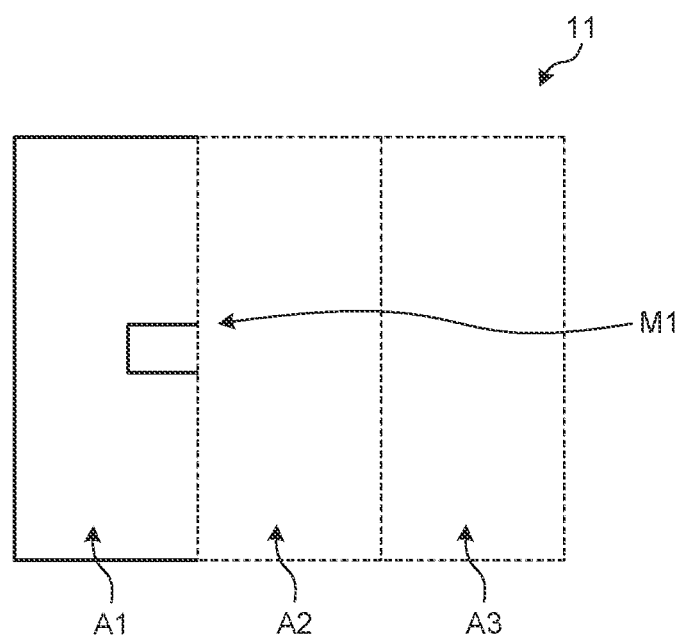
FIG. 5 is a schematic diagram illustrating an output image of a first panel, which is one of the three display panels.
Figure 6:
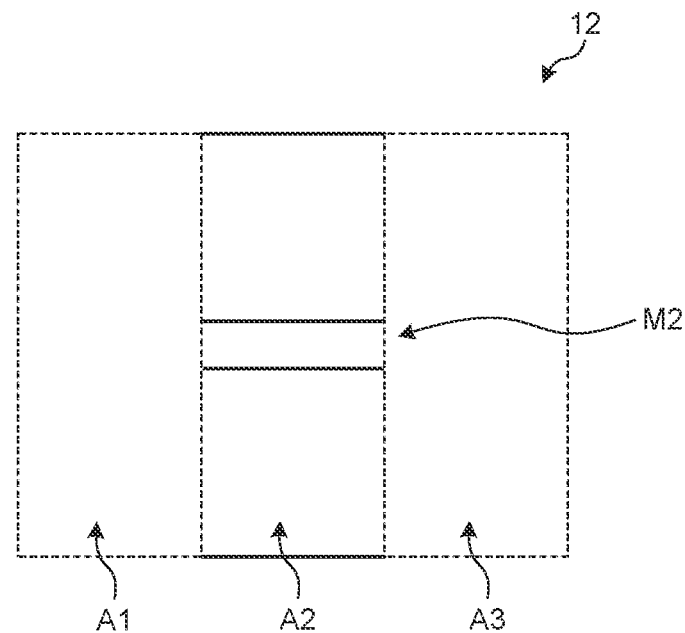
FIG. 6 is a schematic diagram illustrating an output image of a second panel, which is one of the three display panels.
Figure 7:
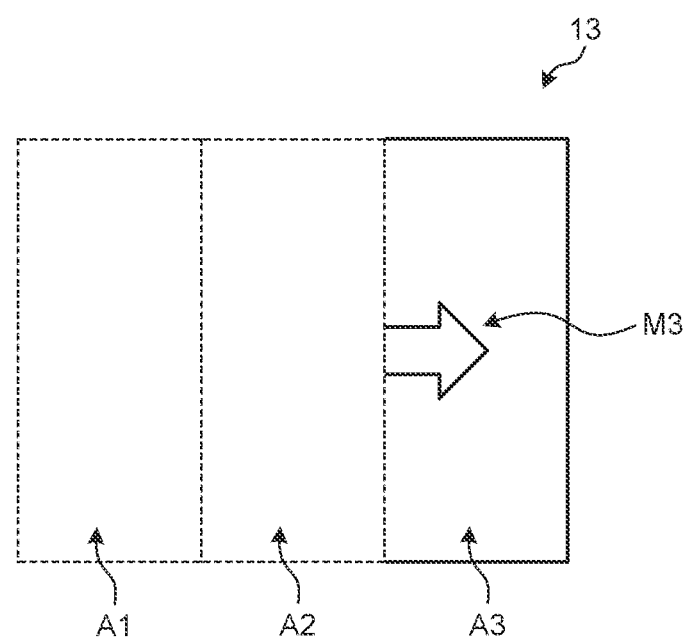
FIG. 7 is a schematic diagram illustrating an output image of a third panel, which is one of the three display panels.

FIG. 5 is a schematic diagram illustrating the output of a first panel 11, which is one of the three display panels 10. FIG. 6 is a schematic diagram illustrating the output of a second panel 12, which is one of the three display panels 10. FIG. 7 is a schematic diagram illustrating the output of a third panel 13, which is one of the three display panels 10. The first panel 11, the second panel 12, and the third panel 13 are the three display panels 10 included in the HUD 1. As illustrated in FIGS. 5, 6, and 7, the first panel 11, the second panel 12, and the third panel 13 are each provided with partial regions A1, A2, and A3, which can be subjected to display control individually.

The display region 21 described above is a combination of the partial regions A1, A2, and A3. Specifically, the partial regions A1, A2, and A3 are each part of the display region 21 that includes the pixels Pix. The partial regions A1, A2, and A3 are different portions from one another in the display region 21. The image output in the partial region A1 is projected onto the projection target, thereby making the partial projection image V1 visible to the user U. The image output in the partial region A2 is projected onto the projection target, thereby making the partial projection image V2 visible to the user U. The image output in the partial region A3 is projected onto the projection target, thereby making the partial projection image V3 visible to the user U.

As illustrated in FIG. 5, the first panel 11 outputs an object M1 in the partial region A1. As a result, the partial projection image V1 illustrated in FIG. 4 is projected onto the projection target. As illustrated in FIG. 6, the second panel 12 outputs an object M2 in the partial region A2. As a result, the partial projection image V2 illustrated in FIG. 4 is projected onto the projection target. As illustrated in FIG. 7, the third panel 13 outputs an object M3 in the partial region A3. As a result, the partial projection image V3 illustrated in FIG. 4 is projected onto the projection target. The objects M1, M2, and M3 are each a component of the object M. As a result of the partial projection image V1 including the object M1, the partial projection image V2 including the object M2, and the partial projection image V3 including the object M3 being projected, the virtual image VG is established that makes the object M visible to the user U.

The first panel 11, the second panel 12, and the third panel 13 may be arranged in such a manner to establish a projection line of light that is recognized as the virtual image VG by the user U, the light being output by the backlight 50 and projected onto the projection target through the display region 21 (the partial regions A1, A2, and A3). In other words, light from the display panels 10 may be directed such that the projection positions of the images from the display regions 21 of the display panels 10 (e.g., the first panel 11, the second panel 12, and the third panel 13) join on the projection target (e.g., the windshield 70). The specific form for achieving light direction is arbitrary. The following schematically describes an exemplary arrangement of the first panel 11, the second panel 12, and the third panel 13 with reference to FIGS. 8 and 9. The arrangement is not limited to this example.

Figure 8:
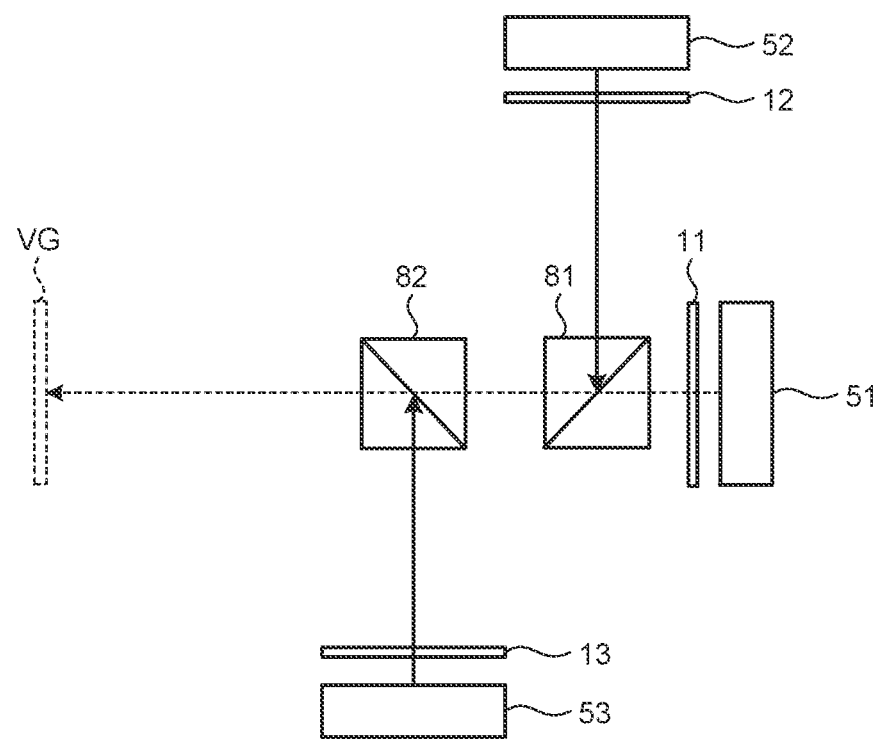
FIG. 8 is a schematic diagram illustrating an exemplary structure in which a backlight is individually provided for each of the three display panels.
Figure 9:
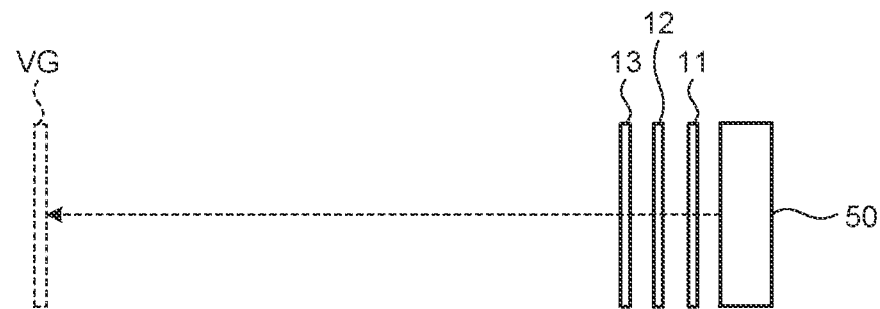
FIG. 9 is a schematic diagram illustrating an exemplary structure in which the three display panels share the backlight.

FIG. 8 is a schematic diagram illustrating an exemplary structure in which the backlights 50 (backlights 51, 52, and 53) are individually provided to the three display panels 10 (the first panel 11, the second panel 12, and the third panel 13). In FIG. 8 and FIG. 9, which is referred to later, the projection lines of light of the image that establishes the virtual image VG are indicated by dashed arrows.

In the example illustrated in FIG. 8, the backlight 51 is provided on the rear side of the first panel 11. The backlight 52 is provided on the rear side of the second panel 12. The backlight 53 is provided on the rear side of the third panel 13. The backlights 51, 52, and 53 are the backlights 50 provided at different positions.

In the structure illustrated in FIG. 8, half mirrors 81 and 82 are provided on the projection line of light of the image that is emitted from the backlight 51 and projected onto the projection target through the first panel 11 to be viewed as the virtual image VG. Light that is emitted from the backlight 52 and passes through the second panel 12 is directed to the half mirror 81. Light that is emitted from the backlight 51 and passes through the first panel 11 is directed to the half mirror 82. The half mirror 81 transmits light that is emitted from the backlight 51 and passes through the first panel 11, and merges the projection line of light that is emitted from the backlight 52 and passes through the second panel 12 with the projection line of light from the backlight 51. The half mirror 82 transmits light from the backlight 51 side and merges the projection line of light that is emitted from the backlight 53 and passes through the third panel 13 with the projection line of light from the backlight 51 side.

FIG. 9 is a schematic diagram illustrating an exemplary structure in which the three display panels 10 (the first panel 11, the second panel 12, and the third panel 13) share the backlight 50. In the structure illustrated in FIG. 9, the first panel 11, the second panel 12, and the third panel 13 arranged on the projection line of light of the image that is emitted from the backlight 51 and projected onto the projection target to be viewed as the virtual image VG. Light emitted from the backlight 50 passes through the first panel 11, the second panel 12, and the third panel 13 and is projected onto the projection target.

In FIGS. 8 and 9, an optical member such as the concave mirror 60 illustrated in FIG. 1 is not illustrated, but in reality, the optical member such as the concave mirror 60 is provided on the projection line of light that is shared by the first panel 11, the second panel 12, and the third panel 13, and reaches the projection target (such as the projection target described above) on which it is viewed as the virtual image VG.

The frame image of the virtual image VG is updated at a frequency corresponding to a predetermined frame rate. The predetermined frame rate is 60 Hz, for example, but is not limited to this, and may be updated at a frequency below or above 60 Hz. The following describes an example of timing control of the outputs of the first panel 11, the second panel 12, and the third panel 13 with reference to FIGS. 10 and 11.

Figure 10:
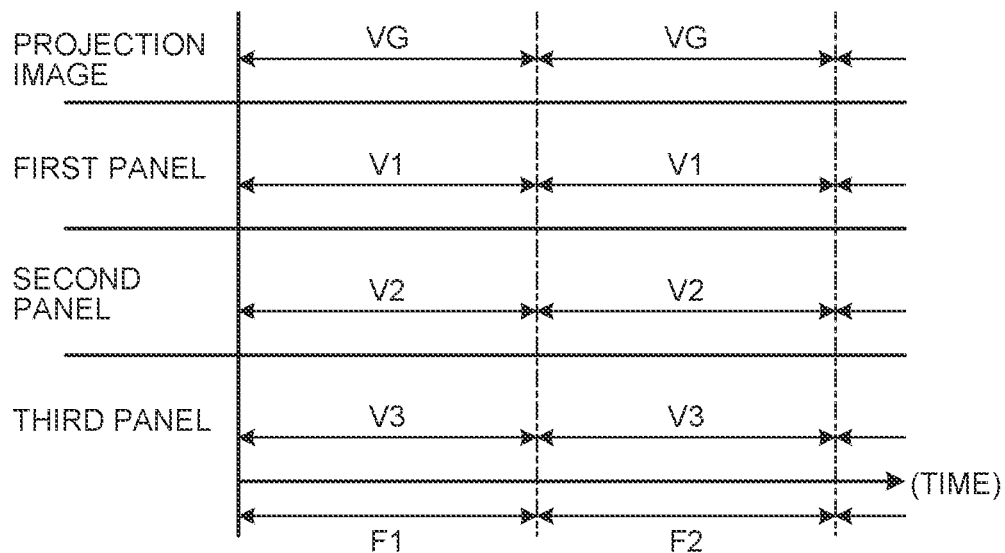
FIG. 10 is a schematic timing chart illustrating an example of control when the first panel, the second panel, and the third panel perform output simultaneously.
Figure 11:
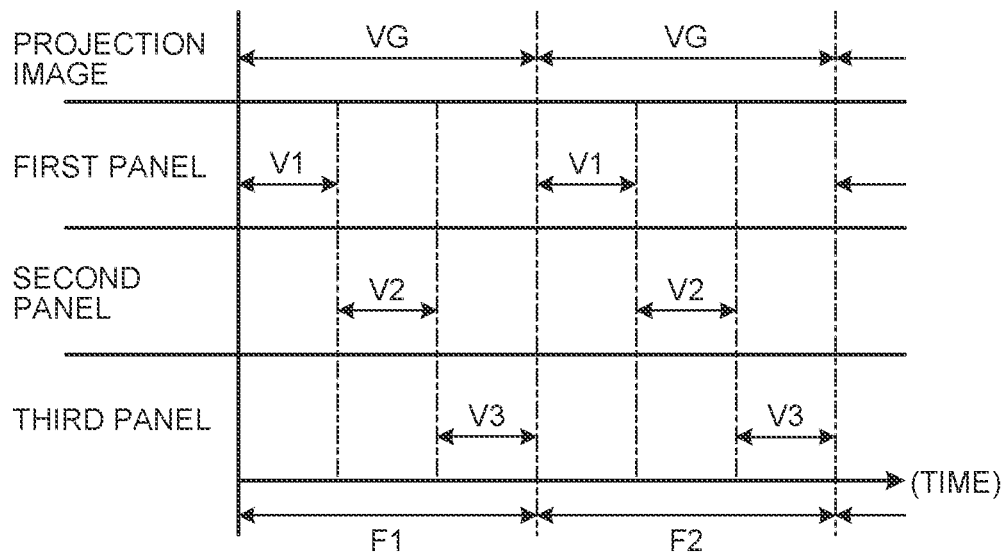
FIG. 11 is a schematic timing chart illustrating an example of control when the first panel, the second panel, and the third panel perform output at different timings.

FIG. 10 is a schematic timing chart illustrating an example of control when the first panel 11, the second panel 12, and the third panel 13 perform output simultaneously. In FIG. 10 and FIG. 11, which is referred to later, a single frame image is displayed in each of frame periods F1 and F2. The frame period F2 is continuously followed by a display period of a single frame image with the same time length, which is not illustrated.

In FIG. 10, in each of the frame periods F1 and F2, output timings of the partial projection image V1 by the first panel 11 (refer to FIG. 5), the partial projection image V2 (refer to FIG. 6) by the second panel 12, and the partial projection image V3 (refer to FIG. 7) by the third panel 13 may be matched to cause the projection images corresponding to the virtual image VG (refer to FIG. 4) to be projected in each of the frame periods F1 and F2.

FIG. 11 is a schematic timing chart illustrating an example of control when the first panel 11, the second panel 12, and the third panel 13 perform output at different timings. As illustrated in FIG. 11, in each of the frame periods F1 and F2, the timing at which the first panel 11 projects the partial projection image V1 (refer to FIG. 5), the timing at which the second panel 12 projects the partial projection image V2 (refer to FIG. 6), and the timing at which the third panel 13 projects the partial projection image V3 (refer to FIG. 7) may be different. In other words, a plurality of divided periods may be provided in one frame period, the number of which corresponds to the number of display panels 10 included in the HUD 1 (e.g., three), and the display panels 10 (e.g., the first panel 11, the second panel 12, and the third panel 13) each may output during a different divided period. In this case, the user U can still view the virtual image VG (refer to FIG. 4) in each of the frame periods F1 and F2.

As described with reference to FIG. 11, when the first panel 11, the second panel 12, and the third panel 13 each perform output at a different timing, the first panel 11, the second panel 12, and the third panel 13 each may use all of the partial regions to provide the output corresponding to the virtual image VG. In other words, the output corresponding to the virtual image VG is provided by the first panel 11, the second panel 12, and the third panel 13 in a rotating manner, a frame rate three times higher than the frame rate corresponding to frame periods F1, F2, . . . can be achieved. In this way, images from the display panels 10 (e.g., the first panel 11, the second panel 12, and the third panel 13) are projected under time-division control to make them visible to the user U, thereby making it possible to reproduce smoother image change in a case where the virtual image VG is a moving image.

The divided periods of the partial projection images V1, V2, and V3 are schematically illustrated by the double pointed arrows in FIGS. 10 and 11. Each period includes the reset timing of the display region 21, the output period of the pixel signals for the pixels Pix (pixel drive period), and the period of light emission from the backlight 50 after the pixel drive period (lighting period), which are not illustrated.

Typical vehicles provided with the HUD 1 and the windshield 70 may be placed under an environment where they are irradiated with sunlight from the sun SUN. Sunlight passing through the windshield 70 and entering the vehicle may be reflected and focused by the concave mirror 60 to reach the display panel 10. In FIG. 1, sunlight beams are schematically illustrated with solid arrows.

In the display panel 10 that receives sunlight, the influence of heat from sunlight may appear. Specifically, the heat may act to interfere with the normal drive of the pixels Pix. More specifically, the liquid crystal element LC in an overheated state may lose its anisotropy and no longer show an orientation corresponding to the pixel signals. To address this, when heat equal to or larger than a predetermined level is detected in one of the display panels 10 (e.g., the first panel 11, the second panel 12, and the third panel 13), the display image of the display panel 10 where such heat is detected can be substituted by the other display panels 10. The following describes a mechanism of such a substitution with reference to FIGS. 12 to 18.

Figure 12:
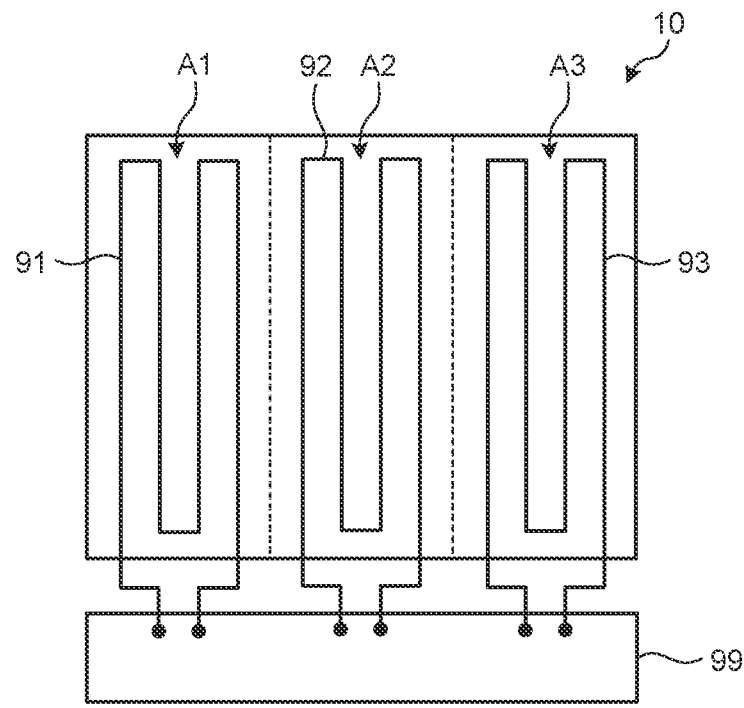
FIG. 12 is a schematic diagram illustrating an exemplary installation of temperature detection electrodes each of which can individually detect the temperature of a corresponding partial region of the display panels.

FIG. 12 is a schematic diagram illustrating an exemplary installation of temperature detection electrodes 91, 92, and 93 that can individually detect the temperature of a corresponding partial region of each of the display panels 10 (e.g., the first panel 11, the second panel 12, and the third panel 13). As illustrated in FIG. 12, the temperature detection electrode 91 is provided in the partial region A1. The temperature detection electrode 92 is provided in the partial region A2. The temperature detection electrode 93 is provided in the partial region A3. Each of the temperature detection electrodes 91, 92, and 93 is an electrode formed of a conductor having an electrical resistance that changes depending on the temperature of the corresponding partial region in which the temperature detection electrode is provided.

The temperature detection electrodes 91, 92, and 93 are coupled to a temperature detector (temperature detection circuit) 99. The temperature detector 99 is a circuit that detects the temperature of each of the partial regions A1, A2, and A3 based on the electrical resistance of each of the temperature detection electrodes 91, 92, and 93.

It is desirable that the temperature detection electrodes 91, 92, and 93 may have a light-transmitting property. To take a specific example, it is desirable that the temperature detection electrodes 91, 92, 93 be formed of a material that allows good transmission of light in the visible light region, such as indium tin oxide (ITO).

The shape of the temperature detection electrodes 91, 92, and 93 illustrated in FIG. 12 is only an example and is not limited to this, and can be modified as appropriate. The temperature detection electrodes 91, 92, and 93 illustrated in FIG. 12 are provided in the multilayered structure of the substrate located on the light emission direction side of the two substrates that sandwich the liquid crystal elements LC in each of the display panels 10, for example. The installation is not limited to the example. The temperature detection electrodes 91, 92, and 93 may be provided on independent substrates. In this case, three independent substrates are prepared for each of the number of display panels 10. The three independent substrates are provided to be overlapped with the display panel 10.

Figure 13:
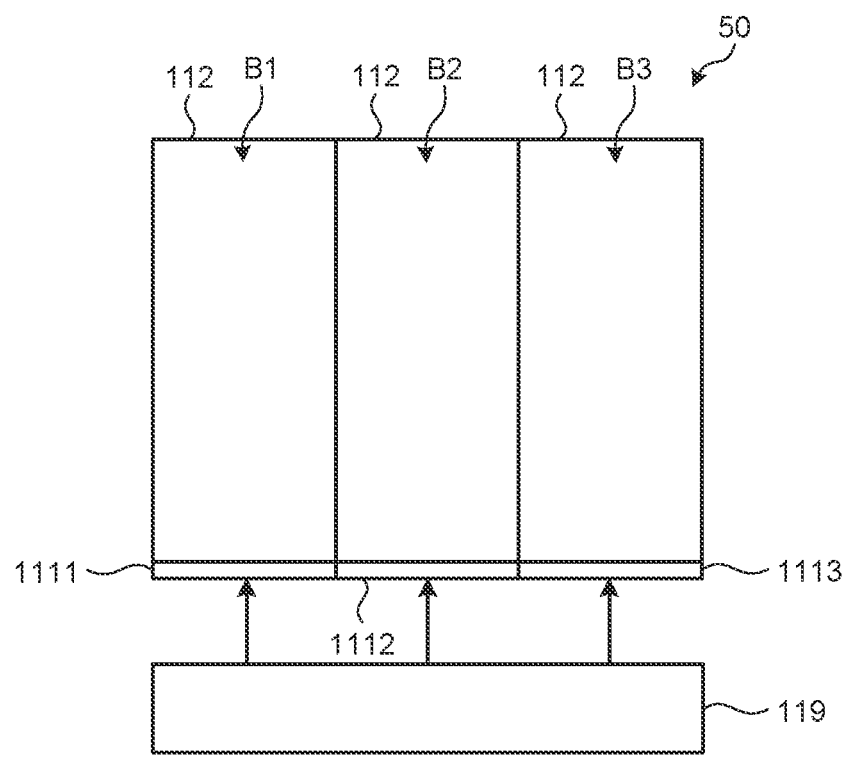
FIG. 13 is a schematic diagram illustrating an exemplary structure of the backlight that can emit light individually to each partial region.

FIG. 13 is a schematic diagram illustrating an exemplary structure of the backlight 50 that can emit light individually to each partial region. As illustrated in FIG. 13, the backlight 50 has light emission regions B1, B2, and B3. The light emission region B1 emits light to the partial region A1 from the rear side of the partial region A1. The light emission region B2 emits light to the partial region A2 from the rear side of the partial region A2. The light emission region B3 emits light to the partial region A3 from the rear side of the partial region A3.

The light emission regions B1, B2, and B3 each have a light source 111 and a light guide plate 112. In the following description, for the purpose of distinguishing the location where the light source 111 is provided (corresponding light emission region), the light source 111 provided to the light emission region B1 may be referred to as a light source 1111, the light source 111 provided to the light emission region B2 may be referred to as a light source 1112, and the light source 111 provided to the light emission region B3 may be referred to as a light source 1113. When referring to the light source 111, it encompasses the light sources 1111, 1112, and 1113. The light source 111 emits light in response to power supply. The light source 111 is a light emitting element, such as a light emitting diode (LED), for example, but is not limited to this example. It is sufficient that the light source 111 has a structure capable of controlling light intensity and timing of light emission. The light guide plate 112 is an optical member that guides light from the light source 111 in a predetermined direction. For example, the light guide plate 112 provided on the rear side of the partial region A1 guides light from the light source 111 that emits light to the light guide plate 112 in a direction that passes through the partial region A1 from the rear side of the partial region A1. Not only the light source 111, but also other components of the HUD 1 operate by receiving power supply from a power source (not illustrated).

In the example illustrated in FIG. 13, the light guide plate 112 is located on the rear side of the display panel 10. A light source such as the light source 111 may be provided on the rear side of the display panel 10.

Figure 14:
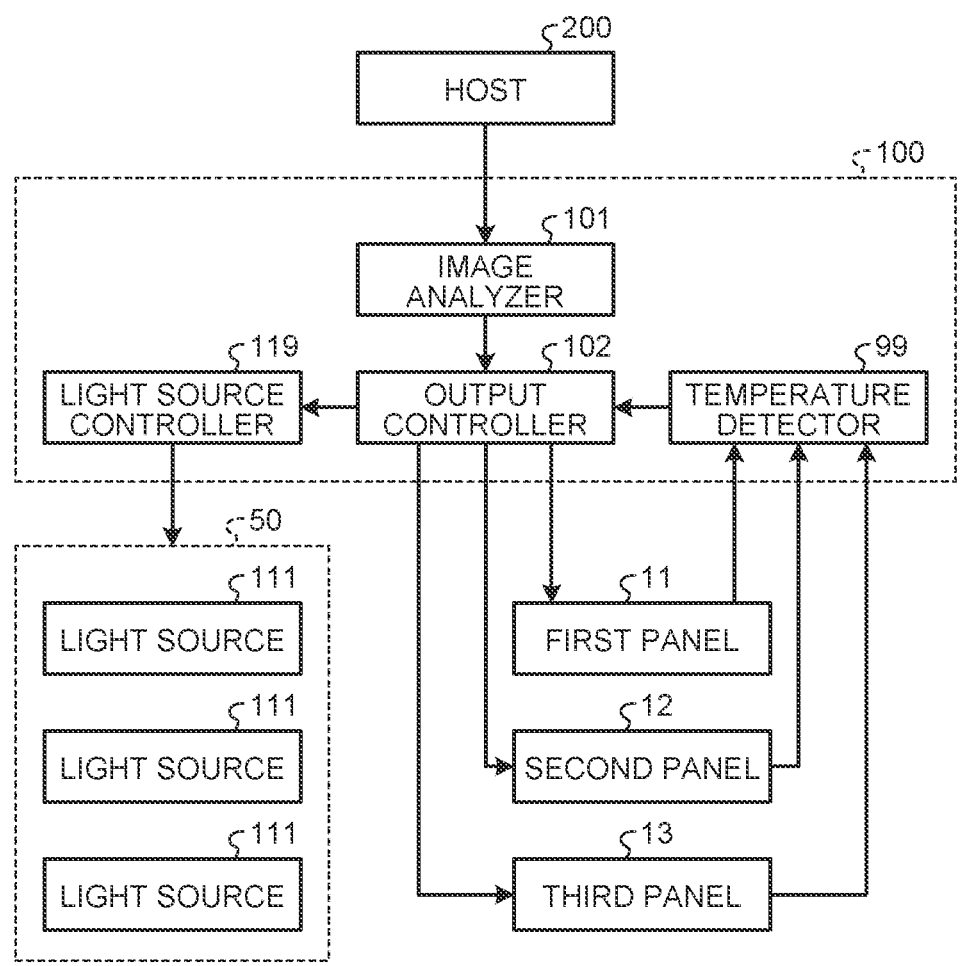
FIG. 14 is a block diagram illustrating a relation between an image processing circuit, the display panels, and a plurality of light sources.

FIG. 14 is a block diagram illustrating a relation between the image processing circuit 100, the display panels 10 (e.g., the first panel 11, the second panel 12, and the third panel 13), and the light sources 111. As illustrated in FIG. 14, the image processing circuit 100 has the temperature detector 99, an image analyzer (image analyzing circuit) 101, an output controller (output control circuit) 102, and a light source controller (light source control circuit) 119.

The image analyzer 101 generates output data for the driver IC 3 (refer to FIG. 2) based on the original image data that is output from the host 200 and input to the image processing circuit 100. The output data includes the pixel signals described above. The output controller 102 determines the allocation of the pixel signals to the display panels 10 based on the temperatures of the partial regions (e.g., the partial regions A1, A2, and A3) of the display panels 10, the temperatures being detected by the temperature detector 99. The light source controller 119 controls the light sources 111 in accordance with the pixel signal allocations determined by the output controller 102.

The temperature detector 99, the image analyzer 101, the output controller 102, and the light source controller 119 that are included in the image processing circuit 100 may be provided as independent circuits or may be provided such that they are partially or fully integrated.

Figure 15:
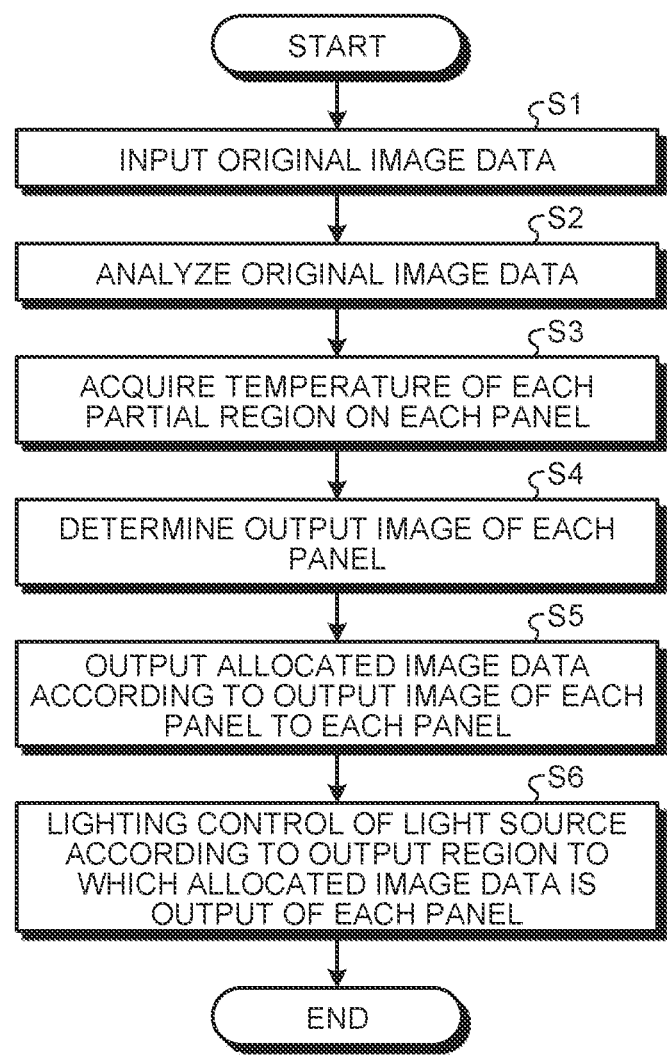
FIG. 15 is a flowchart illustrating an exemplary flow of the processing by the image processing circuit.

FIG. 15 is a flowchart illustrating an exemplary flow of processing by the image processing circuit 100. When the original image data is input (step S1), the image analyzer 101 analyzes the original image data (step S2) and generates the output data including the pixel signals. The temperature detector 99 acquires the temperature of each region of each display panel 10, i.e., the temperature of each partial region (step S3).

The output controller 102 determines the allocation of the pixel signals to the display panels 10 based on the temperature of each partial region acquired by the processing at step S3. In other words, the output controller 102 determines the output image of each display panel 10 (step S4). The output controller 102 outputs the allocated image data according to the output image of each display panel 10 determined at step S4 (step S5). The allocated image data refers to the image data consisting of the pixel signals allocated for each display panel 10. The light source controller 119 controls lighting of the light source 111 according to the output region of each display panel 10 to which the allocated image data is output, the allocated image data being data output to the display panel 10 by the processing at step S5 (step S6). The output region is any of the partial regions (e.g., the partial regions A1, A2, and A3) of the display region 21.

Examples of the output control based on the processing described with reference to FIG. 15 are described with reference to FIGS. 16 and 17.

Figure 16:
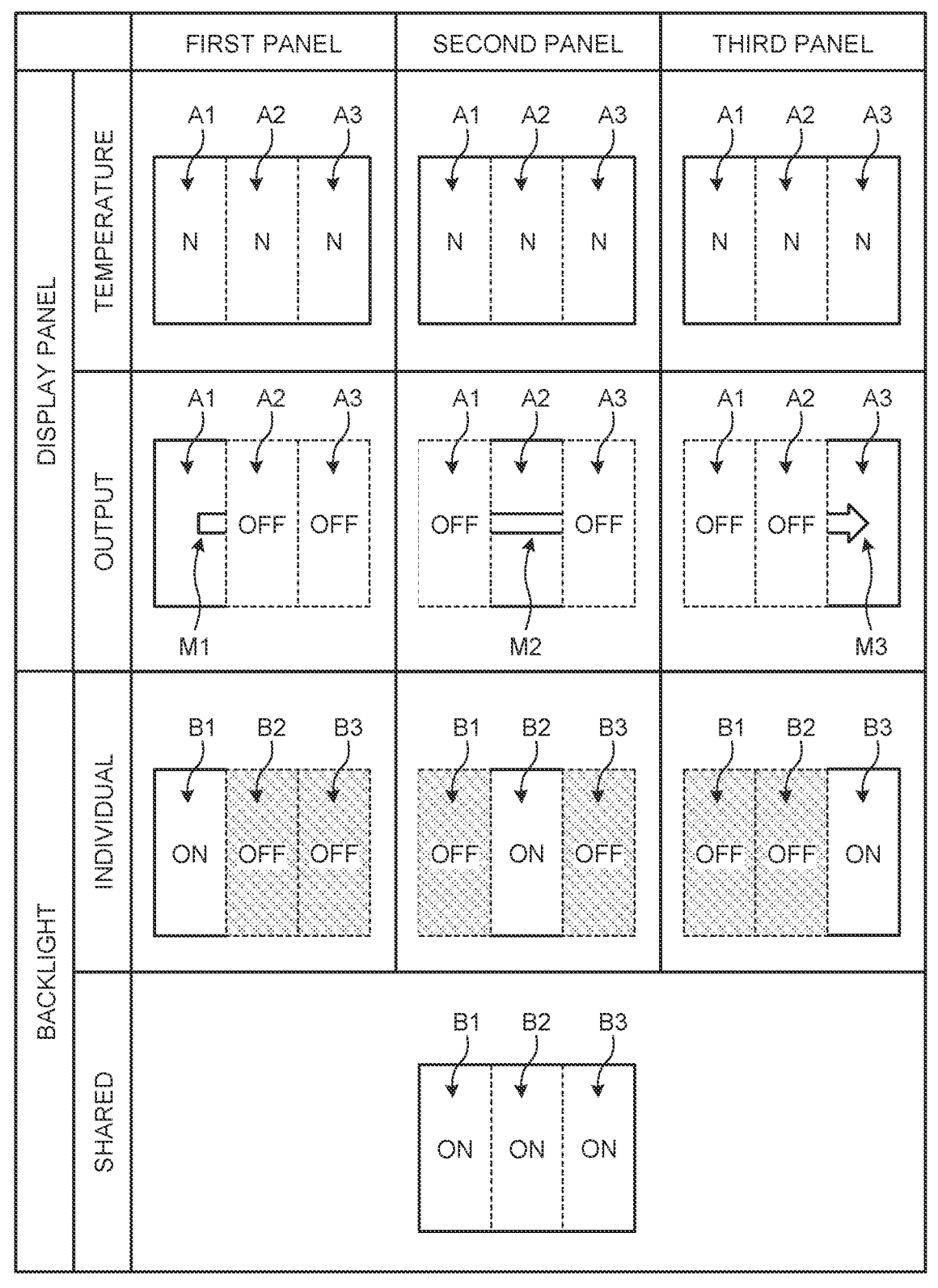

FIG. 16 is a diagram illustrating an example of the outputs of the display panels 10 and lighting control of the backlights when output control in consideration of temperature is not required. When the temperatures of the partial regions A1, A2, and A3 of each of the first panel 11, the second panel 12, and the third panel 13 detected by the temperature detector 99, are all lower than a predetermined threshold temperature, the first panel 11, the second panel 12, and the third panel 13 can all provide good outputs corresponding to the allocated image data. In this case, normal output control is applied. In the "temperature" row of the "display panel" row in FIG. 16, the symbols "N" indicate that the temperatures in the partial regions A1, A2, and A3 of each of the first panel 11, the second panel 12, and the third panel 13 are all lower than the threshold temperature. The threshold temperature is described later.

FIG. 16 illustrates a case where the outputs described with reference to FIGS. 5 to 7 are provided as the normal output control. In other words, the "output" row of the "display panel" row indicates the same output images as described with reference to FIGS. 5 to 7. The output controller 102 outputs the allocated data corresponding to the "output" row of the "display panel" row to the first panel 11, the second panel 12, and the third panel 13. Specifically, the object M1 is output in the partial region A1 of the first panel 11, in the same manner as the explanation described with reference to FIG. 5. The object M2 is output in the partial region A2 of the second panel 12, in the same manner as the explanation described with reference to FIG. 6. The object M3 is output in the partial region A3 of the third panel 13, in the same manner as the explanation made with reference to FIG. 7. This makes the virtual image VG, which is described with reference to FIG. 4, visible to the user U.

The light source controller 119 controls the light source 111 such that light is emitted from the light emitting region corresponding to the partial region where output is performed in each display panel 10. Specifically, in the first panel 11, the object M1 is output in the partial region A1, and no output is provided in the partial regions A2 and A3. In the second panel 12, the object M2 is output in the partial region A2, and no output is provided in the partial regions A1 and A3. In the third panel 13, the object M3 is output in the partial region A3, and no output is provided in the partial regions A1 and A2. Thus, the light source controller 119 controls the light source 111 such that light is emitted to each of the partial region A1 of the first panel 11, the partial region A2 of the second panel 12, and the partial region A3 of the third panel 13 from the rear thereof.

When the structure illustrated in FIG. 8 is employed in which the first panel 11, the second panel 12, the third panel 13, and the backlights 51, 52, and 53 are provided, the light source controller 119 turns on the light source 1111 provided to the light emission region B1 among the light sources 111 included in the backlight 51 and does not turn on the light source 1112 provided to the light emission region B2 and the light source 1113 provided to the light emission region B3. The light source controller 119 turns on the light source 1112 provided to the light emission region B2 among the light sources 111 included in the backlight 52 and does not turn on the light sources 1111 provided to the light emission region B1 and the light source 1113 provided to the light emission region B3. The light source controller 119 turns on the light source 1113 provided to the light emission region B3 and does not turn on the light sources 1111 provided to the light emission region B1 and the light source 1112 provided to the light emission region B2, among the light sources 111 included in the backlight 53. In the "individual" row of the "backlight" row in FIG. 16, "ON" is marked for the light emission region where light is emitted while "OFF" is marked for the light emission region where light is not emitted. That is, the light source controller 119 controls the light source 111 to turn on the light source 1111 provided to the light emission region B1 corresponding to the partial region A1 providing the output on the first panel 11, to turn on the light source 1112 provided to the light emission region B2 corresponding to the partial region A2 providing the output on the second panel 12, and to turn on the light source 1113 provided to the light emission region B3 corresponding to the partial region A3 providing the output on the third panel 13.

When the structure illustrated in FIG. 9 is employed in which the first panel 11, the second panel 12, the third panel 13, and the backlight 50 are provided, the light source controller 119 turns on all of the light sources 111 provided to the light emission regions B1, B2, and B3 because the backlight 50 illuminates the partial region A1 of the first panel 11, the partial region A2 of the second panel 12, and the partial region A3 of the third panel 13. In the "share" row of the "backlight" row in FIG. 16, "ON" is marked for the emission regions where light is emitted.

Figure 17:
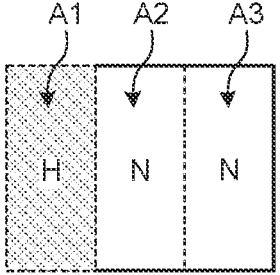
FIG. 17 is a diagram illustrating an example of the outputs of the display panel and lighting control of the backlight when output control in consideration of temperature is required.

FIG. 17 is a diagram illustrating an example of the outputs of the display panels 10 and lighting control of the backlights when output control in consideration of temperature is required. When, among the temperatures of the partial regions A1, A2, and A3 of the first panel 11, the second panel 12, and the third panel 13 detected by the temperature detector 99, the temperature of the partial region A1 of the first panel 11 is equal to or higher than the threshold temperature while the temperatures of the other partial regions are lower than the threshold temperature, the partial region A1 of the first panel 11 may not be able to provide good outputs corresponding to the allocated image data. On the other hand, the other partial regions can provide good outputs corresponding to the allocated image data. In this case, the output control is applied that allocates the allocated image data for the partial region A1 of the first panel 11 to the display panel other than the first panel 11. Unlike FIG. 16, in the "temperature" row of the "display panel" row in FIG. 17, the symbol "H" indicates that the temperature of the partial region A1 of the first panel 11 is equal to or higher than the threshold temperature. In the structure described with reference to FIG. 9, the display panels 10 (e.g., the first panel 11, the second panel 12, and the third panel 13) are aligned in the optical axis direction of light emitted from the backlight 50. Even if sunlight enters the display panels 10 with the focal point of the sunlight located on the position of any one of the display panels 10, the local temperature rise due to the collection of the sunlight in the other display panels 10 is less than that in the one display panel 10. In this way, a local temperature rise can be avoided in all of the display panels 10. In other words, an event such as the "case where the temperature of the partial region A1 of the first panel 11 is equal to or higher than the threshold temperature and the temperatures of the other partial regions are below the threshold temperature" exemplified above can occur when such a structure is employed. The same effect can be achieved in the structure described with reference to FIG. 8 by making the path length of light to the projection position different between the display panels (e.g., the first panel 11, the second panel 12, and the third panel 13). In the embodiment, it is desirable to arrange the display panels 10 at such distances that the focal points of sunlight do not coincide.

The output controller 102 outputs the allocated data corresponding to the "output" row of the "display panel" row to the first panel 11, the second panel 12, and the third panel 13. Specifically, unlike the explanation made with reference to FIG. 5, the object M2 is output in the partial region A2 of the first panel 11. In other words, the output image, which is explained with reference to FIG. 6, of the second panel 12 is allocated to the first panel 11. This prevents the output from being provided in the partial region A1 of the first panel 11. This makes it possible to prevent the occurrence of a state in which display output is performed in the partial region A1 of the first panel 11 and no good output is provided. The object M1 is output in the partial region A1 of the second panel 12. This allows the output of the object M1, which is no longer displayed on the first panel 11, to be substituted by the second panel 12. The object M3 is output in the partial region A3 of the third panel 13, in the same manner as the explanation made with reference to FIG. 7. This causes the virtual image VG, which is described with reference to FIG. 4, to be visible to the user U.

The light source controller 119 controls the light source 111 such that light is emitted from the light emitting regions corresponding to the partial regions where display output is performed on the display panels 10. Specifically, in the example illustrated in FIG. 17, in the first panel 11, the object M2 is output in the partial region A2 while no output is provided in the partial regions A1 and A3. In the second panel 12, the object M1 is output in the partial region A1, and no output is provided in the partial regions A2 and A3. In the third panel 13, the object M3 is output in the partial region A3, and no output is provided in the partial regions A1 and A2. Thus, the light source controller 119 controls the light source 111 such that light is emitted to each of the partial region A2 of the first panel 11, the partial region A1 of the second panel 12, and the partial region A3 of the third panel 13 from the rear thereof.

When the structure illustrated in FIG. 8 is employed in which the first panel 11, the second panel 12, the third panel 13, and the backlights 51, 52, and 53 are provided, the light source controller 119 controls the light source 111 such that each light emission region is in the lighting status indicated in the "individual" row of the "backlight" row in FIG. 17. Specifically, the light source controller 119 turns on the light source 1112 provided to the light emission region B2 and does not turn on the light source 1111 provided to the light emission region B1 and the light source 1113 provided to the light emission region B3, among the light sources 111 included in the backlight 51. The light source controller 119 turns on the light source 1111 provided to the light emission region B1 and does not turn on the light sources 1112 provided to the light emission region B2 and the light source 1113 provided to the light emission region B3, among the light sources 111 included in the backlight 52. The light source controller 119 turns on the light source 1113 provided to the light emission region B3 and does not turn on the light sources 1111 provided to the light emission region B1 and the light source 1112 provided to the light emission region B2, among the light sources 111 included in the backlight 53. In FIG. 17, "ON" is marked for the light emission regions where light is emitted while "OFF" is marked for the light emission region where light is not emitted.

When the structure illustrated in FIG. 9 is employed in which the first panel 11, the second panel 12, the third panel 13, and the backlight 50 are provided, the light source controller 119 turns on all of the light sources 111 provided to the light emission regions B1, B2, and B3 in the same manner as the case illustrated in FIG. 16 because the backlight 50 illuminates the partial region A2 of the first panel 11, the partial region A1 of the second panel 12, and the partial region A3 of the third panel 13.

In FIG. 17, the output control is performed such that the output of the partial region A1 of the first panel 11 in FIG. 16 is allocated to the second panel 12, and the output of the partial region A2 of the second panel 12 in FIG. 16 is allocated to the first panel 11. The allocation is not limited to this. For example, the output of the second panel 12 and the output of the third panel 13 in FIG. 17 may be interchanged. When the outputs are interchanged in this way, "ON" and "OFF" in the "individual" row of the "backlight" row are also interchanged in the same way. When the control illustrated in FIG. 17 is performed, and when the output corresponding to the virtual image VG is provided by the first panel 11, the second panel 12, and the third panel 13 in a rotating manner as described with reference to FIG. 11, the order of operation of the first panel 11 and the second panel 12 in which the partial regions A1 and A2 are interchanged is also interchanged. In other words, in the example illustrated in FIG. 11, the second panel 12 projects the partial projection image V1 at the timing at which the first panel 11 projects the partial projection image V1 while the first panel 11 projects the partial projection image V2 at the timing at which the second panel 12 projects the partial projection image V2.

The threshold temperature is determined based on the temperature at which the liquid crystal employed in the display panel 10 loses its anisotropy, for example. To take a specific example, the liquid crystal is very likely to lose its anisotropy at a temperature equal to or higher than 100° C. When the temperature of the liquid crystal is equal to or higher than 50° C., it becomes necessary to consider the possibility of shifting to a state where its anisotropy is lost as the temperature further rises. Based on this tendency of the liquid crystal, the threshold temperature is set to 50° C., for example. The threshold temperature is not limited to this example. The threshold temperature may be higher than this example.

When a partial region of the display panel 10 the temperature of which becomes equal to or higher than the threshold temperature must be used for output, the luminance of light from the rear side of the partial region may be set to be lower than that in a case where the temperature is lower than the threshold temperature.

Figures 18, 19:
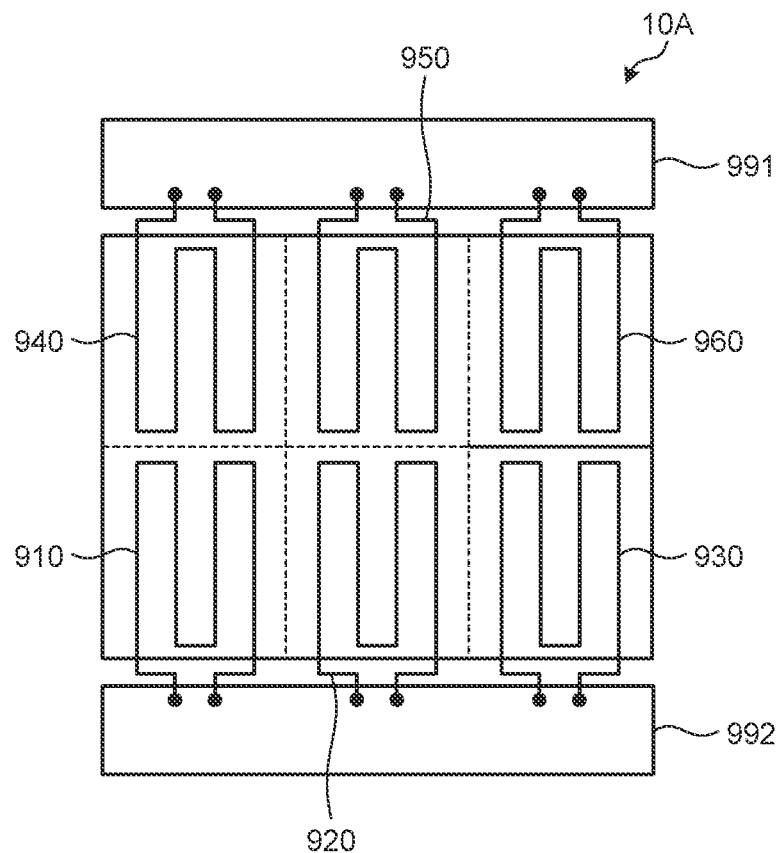
FIG. 18 a diagram illustrating an exemplary correspondence between a threshold temperature and output luminance control.
FIG. 19 is a diagram illustrating an exemplary structure of a display panel that can detect each temperature of six partial regions individually.

FIG. 18 is a diagram illustrating an exemplary correspondence between the threshold temperature and output luminance control. In the example illustrated in FIG. 18, when the "determination" row is "N", it indicates that the temperature is lower than the threshold temperature. When the "determination" row is "H", it indicates that the temperature is equal to or higher than the threshold temperature.

For example, when the threshold temperature is 50° C., the determination for the partial region where the temperature is lower than 50° C. is "N". The light source controller 119 controls the luminance of the light from the rear side of the partial region to be the maximum luminance (100%) when the light source 111 is on.

On the other hand, the determination for the partial region where the temperature is equal to or higher than 50° C. is "H". The light source controller 119 controls the luminance of the light from the rear side of the partial region to be lower than the maximum luminance (100%) when the light source 111 is on.

FIG. 18 illustrates an example where the temperature range equal to or higher than the threshold temperature is further subdivided to allow multi-step control of the luminance of the light source 111. The light source controller 119 performs control such that the luminance of the light from the rear side of the partial region where the temperature is equal to or higher than 50° C. and lower than 60° C. is 50% of the maximum luminance when the light source 111 is on, for example. The light source controller 119 performs control such that the luminance of the light from the rear side of the partial region where the temperature is equal to or higher than 60° C. and lower than 70% is 40% of the maximum luminance when the light source 111 is on. The light source controller 119 performs control such that the luminance of the light from the rear side of the partial region where the temperature is equal to or higher than 70° C. and lower than 80° C. is 30% of the maximum luminance when the light source 111 is on. The light source controller 119 performs control such that the luminance of the light from the rear side of the partial region where the temperature is equal to or higher than and lower than 90° C. is 20% of the maximum luminance when the light source 111 is on. The light source controller 119 performs control such that the luminance of the light from the rear side of the partial region where the temperature is equal to or higher than 90° C. and lower than 100° C. is 10% of the maximum luminance when the light source 111 is on.

Examples of a case where output is performed whatever the light luminance is lower than the maximum luminance includes a case where the temperatures of the partial regions (e.g., the partial regions A1) at the same location on all of the display panels 10 are equal to or higher than the threshold temperature. When the output is continuously performed in such a case, the output controller 102 allocates the pixel signals corresponding to the image to be output in the partial region A1, to the partial region A1 having the relatively lowest temperature among the partial regions A1 of the display panels 10. The light source controller 119 turns on, with the luminance described with reference to FIG. 18, the light source 1111 provided to the light emission region B1 located on the rear side of the partial region A1 having the relatively lowest temperature among the partial regions A1 of the display panels 10. When the control routine corresponding to FIG. 18 is applied, the partial regions A1 of the display panels 10 may be caused to project the same output image, and the combined luminance of the light from the backlights 50 illuminating the respective display panels 10 from the rear side thereof may be 100%. When the temperatures of the partial regions A1 of all the display panels 10 become equal to or higher than 50° C. and lower than 60° C., the image processing circuit 100 performs control such that the partial projection image V1 is output in two partial regions A1 of the display panels 10 and light is emitted from the backlights 50 on the rear side of the two partial regions A1 at 50% of the maximum luminance. This allows both prevention of rise in load and temperature of each of the display panels 10, and maintenance of the output corresponding to 100% luminance of light. The present disclosure is not limited to such exemplified projection by the two display panels 10. The same control may be performed using three or more display panels 10.

The light source controller 119 performs control such that the luminance of the light from the rear side of the partial region where the temperature is equal to or higher than 100° C. is 0% of the maximum luminance when the light source 111 is on. In other words, the light source controller 119 controls the light source 111 such that the light source 111 dose not emit light to the partial region where the temperature is equal to or higher than 100° C. This is intended to stop an output because the liquid crystal is considered to be in a state of anisotropy at an extremely high probability in the partial region where the temperature is equal to or higher than 100° C.

The control routine corresponding to FIG. 18 is implemented in the light source controller 119. In this case, an output indicating the temperature of each partial region detected by the temperature detector 99, is also input to the light source controller 119.

The above describes an example where the temperature of each of the partial regions A1, A2, and A3 is individually detectable in the display panel 10. However, it is only an example and the display panel 10 is not limited to this example.

FIG. 19 is a schematic diagram illustrating an exemplary structure of a display panel 10A that can detect the temperature of each of six partial regions individually. As illustrated in FIG. 19, the six partial regions provided in the display region 21. Temperature detection electrodes 910, 920, 930, 940, 950, and 960 are each provided in one of the six partial regions, and the electric resistances thereof are individually detectable. As a result, control can be performed based on the temperature of each partial region. The number of partial regions in the display region 21 is arbitrary, not limited to six as illustrated in FIG. 19 or three as described with reference to FIG. 12. In other words, a structure capable of performing individual temperature detection may be provided corresponding to the number of partial regions in the display region 21.

In FIG. 19, the temperature detection electrodes 910, 920, and 930 are coupled to a temperature detector 992 while the temperature detection electrodes 994, 995, and 996 are coupled to a temperature detector 991. The temperature detectors 991 and 992 have the same structure as the temperature detector 99. The temperature detectors 991 and 992 may be integrated into a single circuit. In this case, it is desirable that the temperature detection is performed taking into account the difference in electrical resistance that may be caused by the difference in wiring length from each of the temperature detection electrodes 910, 920, 930, 940, 950, 960 to the circuit.

The above describes an exemplary case where the number of display panels 10 is three. The number of display panels 10 can be two, or four or more. The specific image of the virtual image VG explained with reference to FIG. 4 is only an example. The image of the virtual image VG that can be projected by the HUD 1 is not limited to the example. The image of the virtual image VG corresponds to any image that can be output by the display panels 10.

When a structure is employed in which the multiple display panels 10 are arranged on the optical axis of light emitted from the backlight 50, such as the structure including the first panel 11, the second panel 12, the third panel 13, and the backlight 50 illustrated in FIG. 9, it is desirable that what is called a normally white liquid crystal display panel is employed for the display panels 10. A normally white liquid crystal display panel maximizes the degree of light transmission when not energized. This configuration makes it easier to maintain a light-transmitting property even when the responsiveness of the liquid crystal included in one or some of the display panels 10 is lowered as their temperature rises, and the outputs of the other display panels 10 the temperatures of which have not yet risen are not hampered. This makes it easier to maintain the outputs of the entire HUD 1. When a structure is employed in which the multiple display panels 10 are arranged on the optical axis of light emitted from the backlight 50, like the structure including the first panel 11, the second panel 12, the third panel 13 and the backlight 50 illustrated in FIG. 9, the control is performed such that the partial region where no output is provided to be in a fully transparent state (what is called a white output). When output is performed in a certain partial region (e.g., the partial region A1) of a certain display panel 10, the fully transparent state eliminates the occurrence of a situation where light is blocked and output is hampered by the equivalent partial region (e.g., the partial region A1) of another display panel 10 on the optical axis of the light emitted from the backlight 50.

As explained above, according to this embodiment, the HUD 1 is a head-up display that projects an image onto a projection target having a light-transmitting property (e.g., the windshield 70) to make the virtual image (e.g., the virtual image VG) visible to the user U. The HUD 1 includes the multiple display panels 10 (e.g., the first panel 11, the second panel 12, and the third panel 13) and a light guide that directs light from the display panels such that the projection positions of the images from the display regions 21 of the display panels join on the projection target. The light guide is the concave mirror for example. The light guide may further include the half mirrors 81 and 82. At least one of the time-division control and multiple display control is applied to the display panels 10. As explained with reference to FIG. 11, the time-division control is operation control of the display panels 10 such that the display panels 10 project images at different timings. The multiple display control is operation control of the display panels 10 in which the partial regions are set in the display region 21 such that the number of the partial regions corresponds to the number of display panels 10 (e.g., the partial regions A1, A2, and A3), and an image is output in one of the partial regions in the display region of each display panel 10 such that the positions of the images projected by the display panels differ from one another. When the time-division control is applied, the operating time of each display panel 10 is relatively shorter than that when a single display panel 10 continues to operate, thereby making it possible to further reduce the amount and time of heat generation of each display panel 10. In addition, the temperature rise of the display panel 10 due to the irradiation of sunlight described above can be distributed to each of the display panels 10. The application of the time-division control makes it possible to reduce the occurrence of a situation in which it is difficult to project images due to the temperature rise of the display panel 10. When the multiple display control is applied, even if the temperature rises locally in the partial regions of one or some of the display panels 10, the display can be continued on the other partial regions of the display panels 10, and the projection of images in an area corresponding to the partial regions where it is difficult to project images on the display panels 10 where the temperatures has risen can be substituted by the other display panels 10. As described above, even when a condition making it difficult to continue complete image projection by a single display panel 10 alone occurs in any of the display panels 10, this embodiment applies either the time-division control or the multiple display control. This makes it possible to continue the image projection by the control for combining the display panels 10 other than the single display panel 10. The embodiment thus can continue the image projection for a longer period of time. Furthermore, when the multiple display control is applied, the region used for image projection can be limited to a single partial region of each of the display panels 10, which differs from a case where a single display panel 10 performs image projection using the entire display region 21. As a result, the partial regions can be generated that are not used for display on each display panel 10, which differs from a case where a single display panel 10 is used, thereby making it possible to further reduce the degradation of each display panel 10.

At least two of the display panels 10 project different images (e.g., the object M1, the object M2, and the object M3) to the projection target (e.g., the windshield 70). Even when one or some of the display panels 10 become a state where it is difficult to continue image projection in most or all of the display region 21, the image projection can be substituted by the structure described above by a combination of the outputs using the partial regions of each of the other two or more display panels 10. Thus, the image projection can be continued for a longer period of time.

Furthermore, the target to which the output is allocated is periodically changed in units of the divided regions in a rotating manner as explained with reference to FIGS. 4 to 7 and FIG. 16. This makes it possible to extend the service life of each display panel 10. For example, the output controller 102 that generates allocation data such that a first period, a second period, and a third period occur periodically, whereby the long service life can be achieved. In the first period, the partial region A1 of the first panel 11 is used, the partial region A2 of the second panel 12 is used, and the partial region A3 of the third panel 13 is used. In the second period, the partial region A2 of the first panel 11 is used, the partial region A3 of the second panel 12 is used, and the partial region A1 of the third panel 13 is used. In the third period, the partial region A3 of the first panel 11 is used, the partial region A1 of the second panel 12 is used, and the partial region A2 of the third panel 13 is used.

The display panels 10 are transmissive liquid crystal display panels, each having the backlight 50 (e.g., the backlight 51, 52, or 53) on the rear side. The backlight 50 is provided such that the light emission thereof can be controlled individually for each of the partial region (e.g., the partial regions A1, A2, and A3) of the display panel 10. The backlight 50 emits light to a single partial region where the image is output and does not emit light to the other partial regions on each display panel 10. This can further reduce the probability of temperature rise in the display panel 10 that would be caused due to light irradiation.

When the display panels 10 share the backlight 50 that emits light from the rear side, the HUD 1 can perform image projection with the single backlight 50 alone.

The HUD 1 further includes the temperature detector 99 that detects the temperature of the display region 21 of each of the display panels 10 individually. The luminance of the light emitted from the backlight 50 to the partial region (e.g., any of the partial regions A1, A2, and A3) with a temperature equal to or higher than the predetermined threshold temperature is caused to be lower than the luminance of the light emitted from the backlight 50 to the partial region with a temperature lower than the predetermined threshold temperature, in the display region 21. This makes it possible to further reduce the probability of the temperature rise in the display panel 10 that would be caused due to the light irradiation to the partial region where the temperature is equal to or higher than the predetermined threshold temperature.

The temperature detector 99 detects the temperature of each of the partial regions (e.g., the partial regions A1, A2, and A3) individually. When the temperature of the partial region (e.g., any of the partial regions A1, A2, and A3) of the display region 21 of one or some of the display panels 10 becomes equal to or higher than the predetermined threshold temperature, control is performed such that the image is not projected from the partial region with the high temperature, and the image is projected from the partial region of another display panel 10, where the partial region of the other display panel 10 projects the image onto the projection target (e.g., the windshield 70) at the same position of the image projected from the partial region with the high temperature. This allows the output of the display panel 10 in which the partial region (e.g., any one of the partial regions A1, A2, and A3) occurs where the temperature is equal to or higher than the predetermined threshold temperature to be substituted by another display panel 10. Thus, the image projection can be continued for a longer period of time.

When the display panels 10 having the time division control described above applied thereto are transmissive liquid crystal display panels and each have the backlight 50 (e.g., the backlights 51, 52, or 53) on the rear side thereof, the backlight 50 on the rear side of the display panel 10 that is in the period of projecting no image is caused to be off during the period. This can further reduce the probability of temperature rise in the display panel 10 that would be caused due to light irradiation. Even when any of the display panels 10 stops displaying, the other display panels 10 continue to display, allowing images to be continuously projected for a longer period of time.

Other action effects provided by the modes described in the above-mentioned embodiment that are obvious from description of the present specification or at which those skilled in the art can appropriately arrive should naturally be interpreted to be provided by the present disclosure.

What is claimed is:

1. A head-up display that is configured to project an image onto a projection target having a light-transmitting property to make a virtual image visible to a user, comprising:
a plurality of display panels, a light guide that is configured to direct light from the display panels such that projection positions of images from display regions of the display panels join on the projection target, and a temperature detector, wherein at least one of time division control and multiple display control is applied to the display panels, the time division control is operation control of the display panels such that the display panels project images at different timings, the multiple display control is operation control of the display panels in which partial regions are set in each of the display regions such that the number of the partial regions corresponds to the number of the display panels, an image is output in one of the partial regions in the display region of each display panel such that the positions of the images projected by the display panels on the projection target differ from one another, the temperature detector is configured to detect a temperature of each partial region individually, and when the temperature of the partial region in the display region of one or some of the display panels is equal to or higher than the predetermined threshold temperature, control is performed such that an image is not projected from the partial region with the high temperature, and the image is projected from the partial region of another display panel that projects an image onto the projection target at the same position of the image projected from the partial region with the high temperature.

2. The head-up display according to claim 1, wherein at least two of the display panels project different images onto the projection target.

3. The head-up display according to claim 2, wherein the display panels are transmissive liquid crystal display panels, each having a backlight on a rear side of the display panel, and the backlight is provided such that light emission thereof is controllable individually for each partial region such that the backlight emits light to the partial region in which an image is output on each display panel and does not emit light to the other partial regions on each display panel.

4. The head-up display according to claim 1, wherein the display panels share a backlight that emits light from a rear side of each display panel.

5. The head-up display according to claim 4, wherein the temperature detector is configured to detect a temperature of the display region of each display panel individually, and in the display region, a luminance of light emitted from the backlight to the partial region with a temperature equal to or higher than a predetermined threshold temperature is lower than a luminance of light emitted from the backlight to the partial region with a temperature lower than the predetermined threshold temperature.

6. The head-up display according to claim 1, wherein the temperature detector is configured to detect a temperature of the display region of each display panel individually, and in the display region, a luminance of light emitted from the backlight to the partial region with a temperature equal to or higher than a predetermined threshold temperature is lower than a luminance of light emitted from the backlight to the partial region with a temperature lower than the predetermined threshold temperature.

7. A head-up display that is configured to project an image onto a projection target having a light-transmitting property to make a virtual image visible to a user, comprising:

a plurality of display panels, a light guide that is configured to direct light from the display panels such that projection positions of images from display regions of the display panels join on the projection target, and a temperature detector that is configured to detect a temperature of the display region of each display panel individually, wherein at least one of time division control and multiple display control is applied to the display panels, the time division control is operation control of the display panels such that the display panels project images at different timings, the multiple display control is operation control of the display panels in which partial regions are set in each of the display regions such that the number of the partial regions corresponds to the number of the display panels, an image is output in one of the partial regions in the display region of each display panel such that the positions of the images projected by the display panels on the projection target differ from one another, at least two of the display panels project different images onto the projection target, the display panels are transmissive liquid crystal display panels, each having a backlight on a rear side of the display panel, the backlight is provided such that light emission thereof is controllable individually for each partial region such that the backlight emits light to the partial region in which an image is output on each display panel and does not emit light to the other partial regions on each display panel, in the display region, a luminance of light emitted from the backlight to the partial region with a temperature equal to or higher than a predetermined threshold temperature is lower than a luminance of light emitted from the backlight to the partial region with a temperature lower than the predetermined threshold temperature, the temperature detector is configured to detect a temperature of each partial region individually, and when the temperature of the partial region in the display region of one or some of the display panels is equal to or higher than the predetermined threshold temperature, control is performed such that an image is not projected from the partial region with the high temperature, and the image is projected from the partial region of another display panel that projects an image onto the projection target at the same position of the image projected from the partial region with the high temperature.

8. A head-up display that is configured to project an image onto a projection target having a light-transmitting property to make a virtual image visible to a user, comprising:

a plurality of display panels, a light guide that is configured to direct light from the display panels such that projection positions of images from display regions of the display panels join on the projection target, and a temperature detector that is configured to detect a temperature of the display region of each display panel individually, wherein at least one of time division control and multiple display control is applied to the display panels, the time division control is operation control of the display panels such that the display panels project images at different timings, the multiple display control is operation control of the display panels in which partial regions are set in each of the display regions such that the number of the partial regions corresponds to the number of the display panels, an image is output in one of the partial regions in the display region of each display panel such that the positions of the images projected by the display panels on the projection target differ from one another, the display panels share a backlight that emits light from a rear side of each display panel, in the display region, a luminance of light emitted from the backlight to the partial region with a temperature equal to or higher than a predetermined threshold temperature is lower than a luminance of light emitted from the backlight to the partial region with a temperature lower than the predetermined threshold temperature, the temperature detector is configured to detect a temperature of each partial region individually, and when the temperature of the partial region in the display region of one or some of the display panels is equal to or higher than the predetermined threshold temperature, control is performed such that an image is not projected from the partial region with the high temperature, and the image is projected from the partial region of another display panel that projects an image onto the projection target at the same position of the image projected from the partial region with the high temperature.

9. A head-up display that is configured to project an image onto a projection target having a light-transmitting property to make a virtual image visible to a user, comprising:

a plurality of display panels, and a light guide that is configured to direct light from the display panels such that projection positions of images from display regions of the display panels join on the projection target, wherein at least one of time division control and multiple display control is applied to the display panels, the time division control is operation control of the display panels such that the display panels project images at different timings, the multiple display control is operation control of the display panels in which partial regions are set in each of the display regions such that the number of the partial regions corresponds to the number of the display panels, an image is output in one of the partial regions in the display region of each display panel such that the positions of the images projected by the display panels on the projection target differ from one another, the time-division control is applied to the display panels, the display panels are transmissive liquid crystal display panels, each having a backlight on a rear side of the display panel, and during a period in which the display panel does not project an image, the backlight on the rear side of the display panel is caused to be off.

* * * * *